United States Patent [19]

Sasaki et al.

[11] Patent Number: 5,470,419
[45] Date of Patent: Nov. 28, 1995

[54] EASILY TEARABLE FILM AND POUCH MADE THEREFROM

[75] Inventors: Hitoshi Sasaki; Yuikio Kobayashi; Shyoji Igota, all of Kawasaki, Japan

[73] Assignee: Ajinomoto Co., Inc., Tokyo, Japan

[21] Appl. No.: 170,990

[22] Filed: Dec. 21, 1993

Related U.S. Application Data

[63] Continuation of Ser. No. 733,823, Jul. 22, 1991, abandoned.

[30] Foreign Application Priority Data

Jul. 30, 1990 [JP] Japan ................................. 2-201874

[51] Int. Cl.⁶ .................................................. B29C 47/00
[52] U.S. Cl. .................. 156/244.12; 493/211; 493/212; 493/930; 493/963; 383/205; 428/98
[58] Field of Search ............................. 428/35.2, 43, 98; 156/244.12; 493/211, 212, 930, 963; 229/235, 239, 311, 312, 200; 383/205, 206

[56] References Cited

U.S. PATENT DOCUMENTS

| | | | |
|---|---|---|---|
| 1,896,425 | 2/1933 | Scarfi | 229/311 |
| 2,176,768 | 10/1939 | Luchte | 229/239 |
| 2,253,876 | 8/1941 | Walters | 229/311 |
| 2,447,096 | 8/1948 | Schneider | 229/239 |
| 2,592,734 | 4/1952 | Pike | 383/205 |
| 3,034,941 | 5/1962 | Hessenthaler | 428/43 |
| 3,054,551 | 9/1962 | Holbrook | 383/206 |
| 3,246,833 | 4/1966 | Schlienz | 383/206 |
| 3,411,968 | 11/1968 | Vilutis | 383/206 |
| 3,426,936 | 2/1969 | Palmer | 383/206 |
| 3,426,959 | 2/1969 | Lemelson | 383/206 |
| 3,494,538 | 2/1970 | Matthews | 383/206 |
| 3,759,439 | 9/1973 | Cross | 383/205 |

FOREIGN PATENT DOCUMENTS

| | | | |
|---|---|---|---|
| 205559 | 8/1990 | Japan | 383/206 |
| 1147846 | 4/1969 | United Kingdom . | |
| 1335304 | 10/1973 | United Kingdom . | |

OTHER PUBLICATIONS

Draht, vol. 39, p. 354, Mar., 1988, "Entwicklung in der Ummantelung Von Flachkabeln MIT 2 BIS 100 Leittern".

*Primary Examiner*—Nasser Ahmad
*Attorney, Agent, or Firm*—Oblon, Spivak, McClelland, Maier, & Neustadt

[57] ABSTRACT

An easily tearable plastic film and a pouch made therefrom comprises a thin-wall part for easy tearing. The thin-wall part being made by incorporating strings in the plastic film when it is made by melt extrusion. A method for producing the film and pouch is also shown.

2 Claims, 5 Drawing Sheets

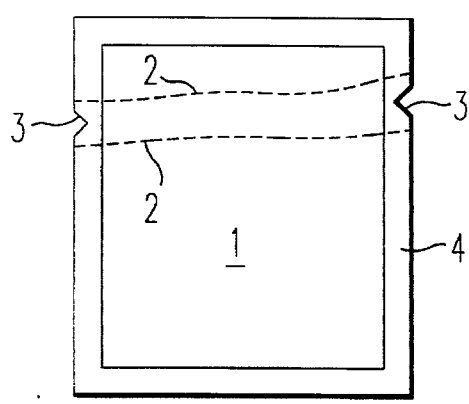 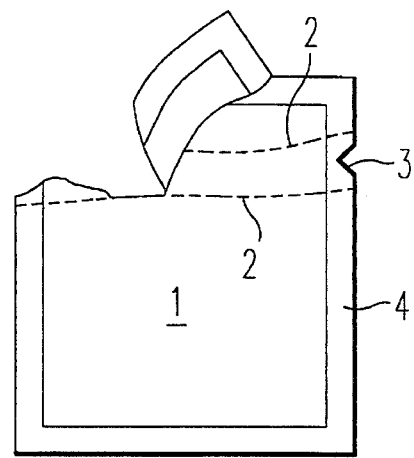
*FIG. 1*  *FIG. 2*
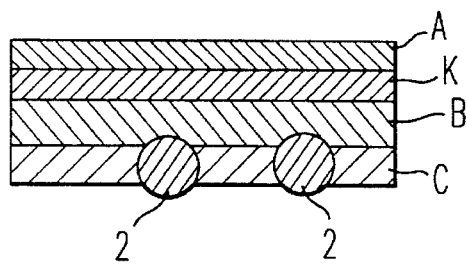 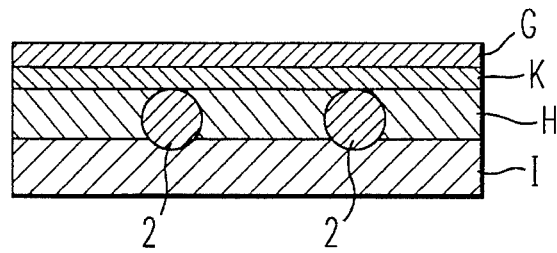
*FIG. 3*  *FIG. 4*

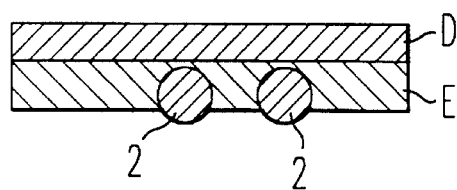
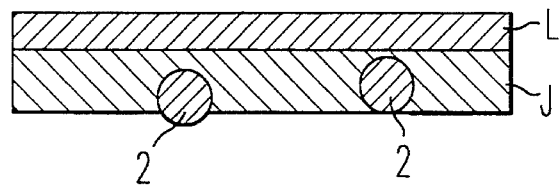
FIG. 5    FIG. 6
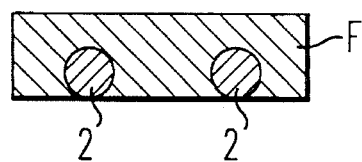
FIG. 7
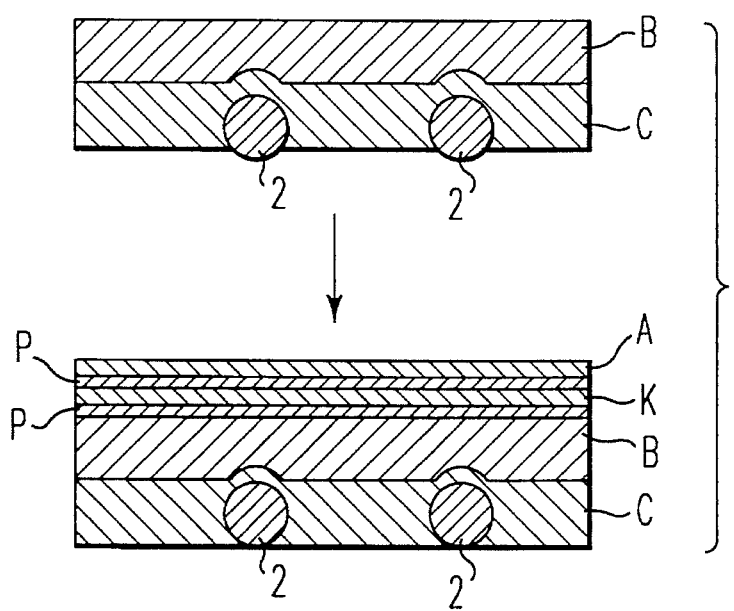
FIG. 8

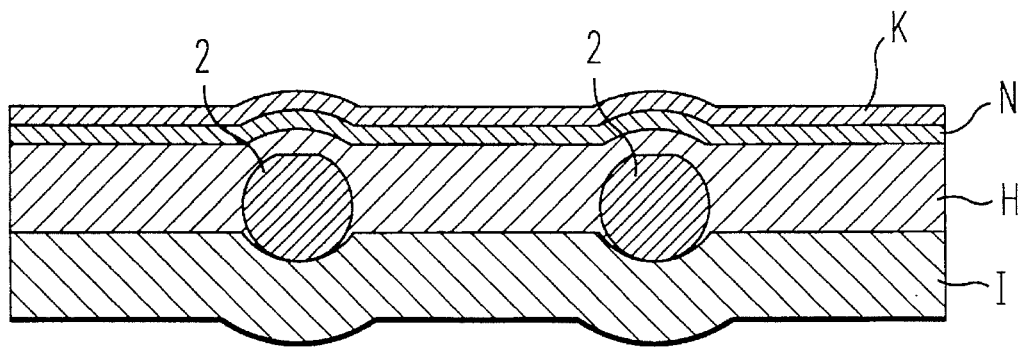
*FIG. 9A*  BEFORE HEATING
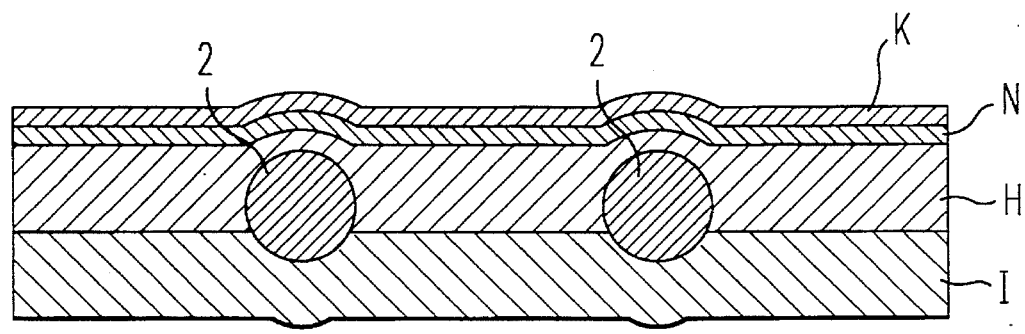
*FIG. 9B*  AFTER HEATING
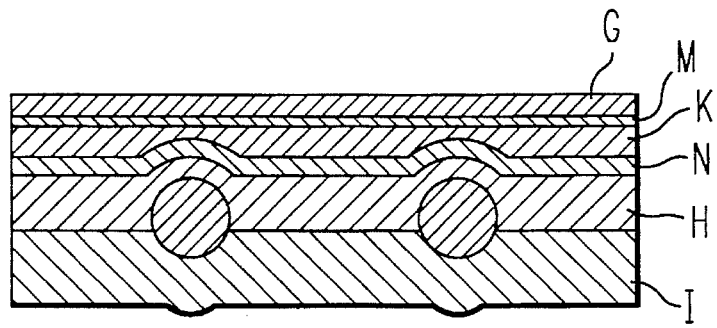
*FIG. 9C*

5,470,419

EASILY TEARABLE FILM AND POUCH MADE THEREFROM

This application is a Continuation of application Ser. No. 07/733,823, filed on Jul. 22, 1991, now abandoned.

BACKGROUND OF THE INVENTION

1. Field of the Invention

The present invention relates to a packing pouch which is easy to open.

2. Discussion of the Background

The conventional method of opening a pouch is by cutting it with a knife or scissors or by tearing it at a notch formed in it. The former method is not practicable when a knife or scissors are not at hand; and the latter method does not permit two sheets of film or laminate constituting the pouch to be torn straight and neat in the same direction because of their lack of directional property. Another disadvantage of tear opening is the difficulty in tearing up the strong heat-sealed part.

There have been proposed several ideas to eliminate these disadvantages. For example, Japanese Patent Laid-open No. 123256/1981 discloses a pouch that can be opened straight by the aid of a uniaxially oriented tape bonded to the pouch in the same direction as that in which the pouch is to be torn. Japanese Patent Laid-open No. 26450/1984 and 13661/1985 disclose a pouch provided with a string which is attached to the inside of one of the sheets constituting the pouch, so that one side of the pouch can be opened by pulling the string.

A disadvantage of the pouch mentioned first is an increased production cost due to the additional steps and materials for bonding a uniaxially oriented tape to the pouch. Moreover, the uniaxially oriented tape does not reduce the inherent tear resistance of the pouch. A disadvantage of the pouch mentioned second is the necessity of a special apparatus for accurately attaching a tab to the end of the tearing string. Moreover, pulling the string to tear open the pouch experiences a great resistive force.

SUMMARY OF THE INVENTION

It is primary object of the present invention to provide an easily tearable plastic film having a thin-wall part therein for easy tearing, said thin-wall part being made by incorporating strings in the plastic film when it is made by melt extrusion.

It is an object of the present invention to provide an easily tearable pouch formed by sealing two webs, each comprising a resin layer formed by melt extrusion and two parallel strings, so that the pouch can be torn easily along one of the two strings when a tear is made between the two parallel strings.

It is another object of the present invention to provide a method for producing the film of a packing pouch which is easy to open.

BRIEF DESCRIPTION OF THE DRAWINGS

FIG. 1 is a plan view of the pouch of the present invention.

FIG. 2 is a plan view of the pouch which is being opened.

FIGS. 3 and 4 are sectional views of the laminate into which strings are incorporated.

FIG. 5 is a partial sectional view of the two-layer laminate containing two strings for easy tear.

FIG. 6 is a partial sectional view of the resin-coated paper containing two strings for easy tear.

FIG. 7 is a partial sectional view of the unsupported film containing two strings for easy tear.

FIGS. 8 and 9 are partial sectional views illustrating how the structure in the vicinity of the string changes as the result of heat treatment.

Figure 10:
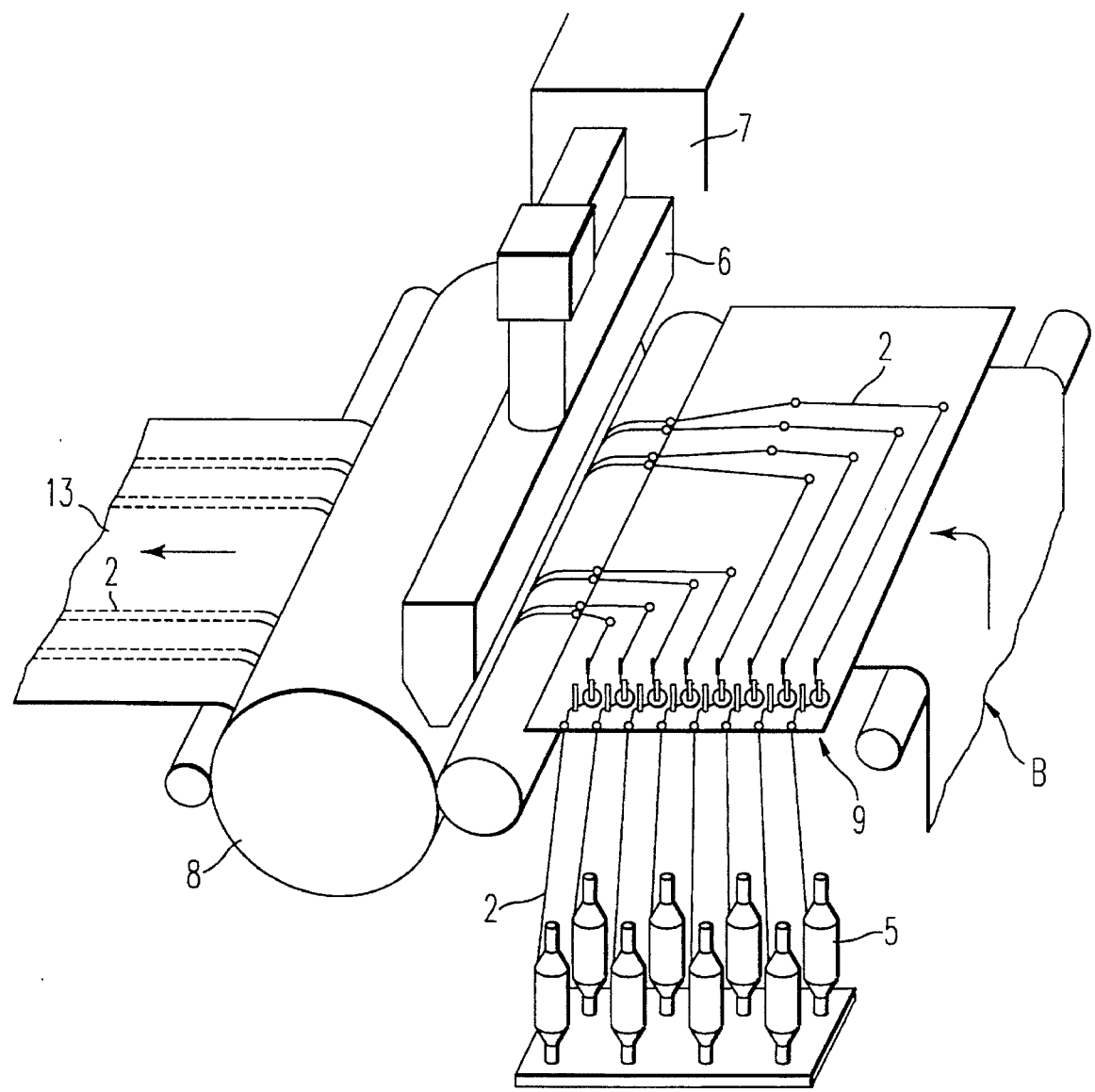
FIG. 10 is a perspective view showing an apparatus used for producing the easy tear pouches according to the present invention.

1 ... Pouch
2 ... String
3 ... Notch
4 ... Seam
4A ... Bottom seam
4B ... Side seam
5 ... Bobbin
6 ... T-die
7 ... Extruder
8 ... Cooling roll
9 ... String tension roller
10 ... Nip roll
11 ... Cutter
12 ... Side cutter
13 ... Easy tear film
13A ... Upper side of web for pouches
13B ... Lower side of web for pouches
A, B, D, F, G, I ... Substrate film
C, E, H, J ... Extruded film
K ... Aluminum foil
L ... Paper
M, P ... Adhesive
N ... Coextruded bonding resin

DETAILED DESCRIPTION OF THE PREFERRED EMBODIMENTS

Means to Solve the Problems

It was found that the above-mentioned problems can be solved if a string is incorporated into a plastic film at the time of its melt extrusion. The string forms a thin-wall part in the plastic film or laminate because it does not fuse into the plastic film even though it is of the same material as the plastic film. The thin-wall part may be properly controlled for its thickness by selecting a string of adequate diameter.

The pouch pertaining to the present invention is constructed of two sheets of plastic film or laminate, each incorporated with two parallel strings, in such a manner that the two strings of one sheet coincide with the two strings of the other sheet. A notch to facilitate tearing is formed in that part of the pouch which is held between the two parallel strings. When the pouch is torn at this notch, the tear runs through along one of the two strings (which forms the thin-wall part). The two strings should be arranged apart at a proper distance, which is preferably 2–10 mm. If the two strings are too close to each other, it is difficult to make a notch between them. If the two strings are too apart, the tear does not run straight but gives rise to an unsightly open mouth.

The string that can be used in the present invention may be of synthetic fiber, natural fiber, or metallic fiber. It may be in the form of monofilament, multifilament, or twisted staple fiber. The synthetic fiber includes nylon (polyamide) fiber, polyester fiber, polyethylene fiber, polypropylene fiber, acrylonitrile fiber, vinylon fiber, carbon fiber, polyimide fiber, and polycarbonate fiber. These synthetic fibers should preferably be the drawn ones which have a sufficient strength, although this is not essential because the string is not pulled when the pouch is opened. (Drawn strings are readily available.) The natural fiber includes cotton, linen, silk, and wool. The string may be made of a mixture of synthetic fiber and natural fiber.

Function of the Invention

The easily tearable plastic film of the present invention was realized by incorporating strings into a plastic film. The string forms a thin-wall part in the plastic film, and this thin-wall part is weakest in the plastic film. The same holds true in the case of laminate with other plastic film, aluminum foil, or paper. The pouch of the present invention is easy to tear open owing to the two parallel strings incorporated thereinto, because the tear runs along one of the strings where the plastic film or laminate is weakest.

The invention will be described in more detail with reference to the following examples, which are not intended to restrict the scope of the invention.

Example 1

A laminate web into which strings are incorporated was prepared in the following manner using an apparatus shown in FIG. 10. A web of unstretched polypropylene film B (50 μm thick) was passed through the apparatus for lamination with a 30-μm thick film of polypropylene resin (having a melt index of 23) extruded at 230° C. from the T-die 6. Simultaneously with lamination, strings 2 (uniaxially stretched polypropylene monofilaments, 50 μm in diameter or 16 denier) were unwound from the bobbins 5 and incorporated into the laminate web 13. The line speed for lamination was 100 m/min. The resulting laminate is composed of a substrate film B and a coated film C, as shown in FIG. 8. It should be noted that since the diameter of the string, which is 50 μm, is greater than the thickness of the coated film C, which is 30 μm, the string swells the coated film. The swollen parts clearly indicate the positions of the strings. The film swelling by strings may be avoided by using thinner strings, if it is undesirable. The thus prepared laminate web was further combined by dry lamination with a polyester-aluminum laminate which is formed by dry lamination of a 12-μm thick polyester film A and a 7-μm thick aluminum foil K with a polyurethane adhesive P (4.5 g/m²). The dry lamination was achieved by coating the aluminum foil K with a polyurethane adhesive (4.5 g/m²). The resulting laminate was made into side seam pouches as shown in FIG. 11. The two laminate webs were placed one over the other, with the coated film inside, in such a manner that strings in one web coincide with strings in the other web. The two webs were heat-sealed to form the bottom seam 4A and side seam 4B and finally cut into individual pouches.

Figure 11:
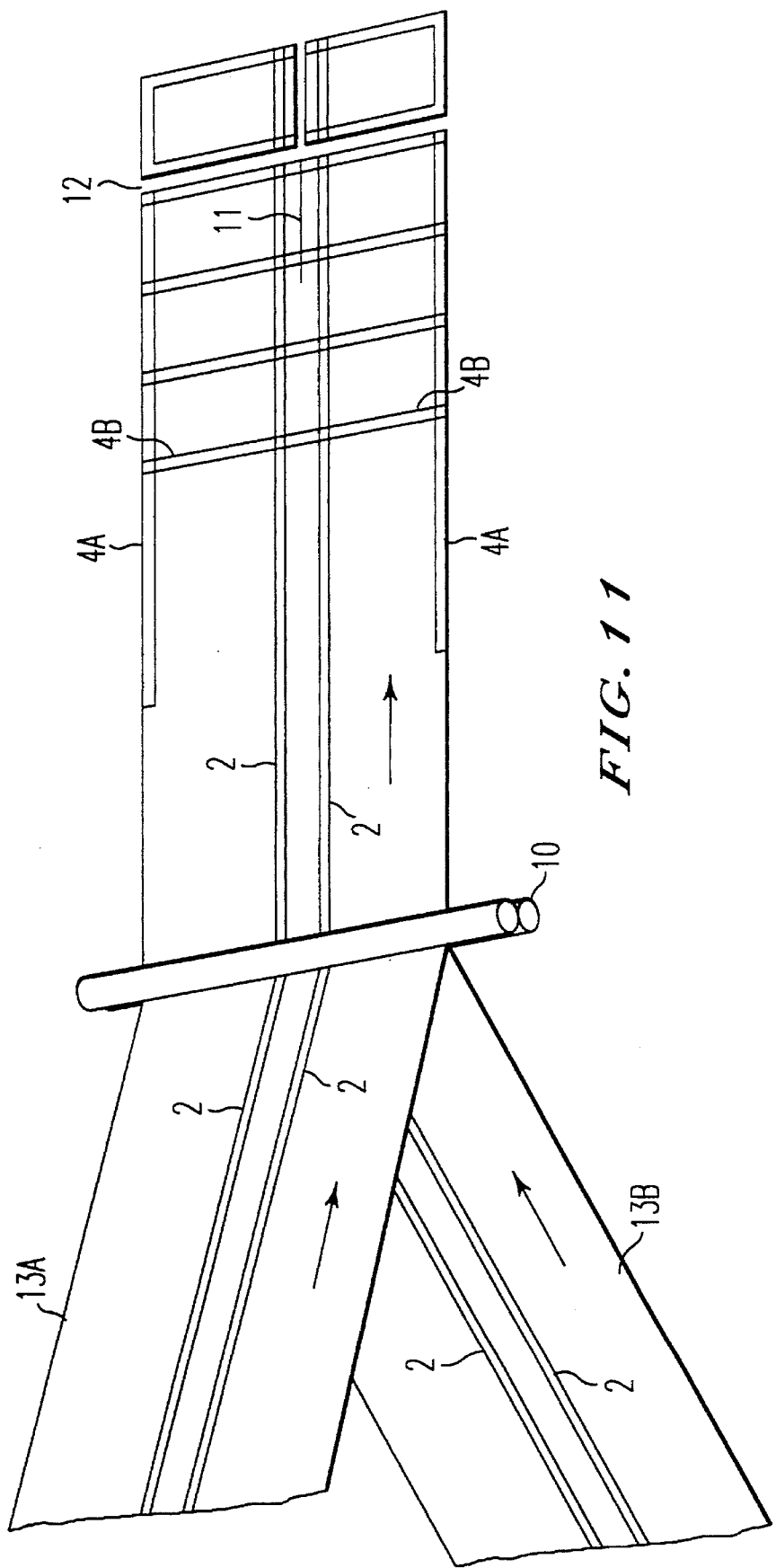
FIG. 11 is a perspective view showing a web which is being converted into pouches.

The laminate produced as shown in FIG. 10 has eight strings so that two pouches can be made from each cut in the crosswise direction. This is only an illustration, and the present invention is not restricted to it. In this embodiment, the distance of the parallel strings was 5 mm. The heat-sealed pouches were finished by forming a notch between the two strings. The thus obtained pouch could be easily and neatly opened because the tear ran from the notch along one of the two strings as shown in FIG. 2. The sealed part was also easily torn apart.

Example 2

A laminate web into which strings are incorporated was prepared in the following manner using an apparatus shown in FIG. 10. A web of unstretched polypropylene film B (50 μm thick) was passed through the apparatus for lamination with a 7-μm thick aluminum foil K which was fed between the T-die 6 and the cooling roll 8 from a let-off roll (not shown). Adhesion of the polypropylene film B to the aluminum foil was accomplished by a composite film coextruded from the T-die at 230° C. This composite film is composed of a 27-μm thick layer of polypropylene (having a melt index of 23) and a 3-μm thick layer of bonding resin (having a melt index of 50), with the bonding resin layer being in contact with the aluminum foil. Simultaneously with lamination, strings 2 (uniaxially stretched polypropylene monofilaments, 40 μm in diameter or 10 denier) were unwound from the bobbins 5 and incorporated into the laminate web 13. The line speed for lamination was 100 m/min. The resulting laminate is constructed as shown in FIG. 9 (before heat treatment). It should be noted that the string slightly swells the aluminum foil K and the polypropylene film I. To increase bond strength between the aluminum foil K and the coextruded bonding resin, the laminate underwent heat treating for 1 second, with the aluminum foil in contact with a hot roll (200° C., 600 mm in diameter). This heat treatment changed the structure of the laminate as shown in FIG. 9 (after heat treatment). It should be noted that the swollen surfaces of the laminate are smoothed out by heating. The heat-treated laminate web was further combined by dry lamination with a 12-μm thick polyester film. The dry lamination was achieved by coating the aluminum foil K with a polyurethane adhesive (4.5 g/m²). The resulting laminate was made into side seam pouches in the same manner as in Example 1. The thus obtained pouch could be easily opened because the tear ran from the notch along one of the two strings.

Example 3

A laminate web into which strings are incorporated was prepared in the following manner using an apparatus shown in FIG. 10. A web of 12-μm thick polyester film B coated with an imine-type undercoat (0.1 g/m²) was passed through the apparatus for lamination with a 50-μm thick film of low-density polyethylene (having a melt index of 8) extruded at 320° C. from the T-die 6. Simultaneously with lamination, strings 2 (uniaxially stretched polypropylene monofilaments, 30 μm in diameter or 6 denier) were unwound from the bobbins 5 and incorporated into the laminate web 13. The line speed for lamination was 120 m/min. The resulting laminate is constructed as shown in FIG. 5. It was made into side seam pouches in the same manner as in Example 1. The thus obtained pouch could be easily opened because the tear ran from the notch along one of the two strings.

Example 4

A laminate web into which strings are incorporated was prepared in the following manner using an apparatus shown in FIG. 10. A web of mirror-coat paper (74 g/m²) B was passed through the apparatus for lamination with a 50-μm thick film of low-density polyethylene (having a melt index of 8) extruded at 320° C. from the T-die 6. Simultaneously with lamination, strings 2 (uniaxially stretched polypropylene monofilaments, 30 μm in diameter or 6 denier) were unwound from the bobbins 5 and incorporated into the laminate web 13. The line speed for lamination was 120 m/min. The resulting laminate is constructed as shown in FIG. 6. It was made into side seam pouches in the same manner as in Example 1. The thus obtained pouch could be easily opened because the tear ran from the notch along one of the two strings.

Example 5

A web of unsupported film into which strings are incorporated was prepared in the following manner using an apparatus shown in FIG. 10. A low-density polyethylene (having a melt index of 3.0) was extruded at 250° C. from the T-die 6 into a 110-μm thick film. Simultaneously with extrusion, strings 2 (uniaxially stretched nylon monofilament, 64 μm in diameter or 26 denier) were unwound from the bobbins 5 and incorporated into the polyethylene film. The line speed was 30 m/min. The resulting film is constructed as shown in FIG. 7. It was made into side seam pouches in the same manner as in Example 1. The thus obtained pouch could be easily opened because the tear ran from the notch along one of the two strings.

Effect of the Invention

According to the present invention, strings are incorporated into a web at the same time when the resin layer is formed by extrusion in the usual way. And the web in which strings are incorporated is formed into pouches in the usual way. Therefore, the method of the present invention does not need any modification in the conventional extrusion process and apparatus. The pouches of the present invention have the same appearance as the ordinary ones which are not fabricated for easy tear, because they have not tapes or the like for easy tear. In addition, they need only a small amount of additional production cost. Owing to the strings incorporated therein, the pouches can be easily torn open at the notch, without the need of scissors, because the tear runs along one of the parallel two strings.

What is claimed is:

1. A method for producing a tearable pouch comprising the steps of:

melt extruding a resin layer forming a coated film on a substrate film to form at least two laminate webs;

incorporating only two strings into the coated film of each of said laminate webs during said extruding step such that said strings are spaced from each other and parallel to each other, and do not fuse into the coated film of said laminate webs, for forming a thin wall portion in each of said at least two laminate webs, wherein the space between said parallel strings is between 2–10 mm;

adhering an aluminum foil—polyester film laminate to the substrate film by adhering the aluminum foil to the substrate film with polyurethane adhesive;

sealing said at least two laminate webs together to form said pouch so that the parallel strings of one web coincide and face the parallel strings of the other web, and the parallel strings extend along a widthwise direction of said pouch; and forming a notch at an edge of said pouch and between said parallel strings to permit the pouch to be torn at said notch and along one of said parallel strings without pulling said parallel strings when an opening of the pouch is initiated.

2. A method according to claim 1, wherein said parallel strings are made of one of a synthetic fiber, natural fiber or metallic fiber.

\* \* \* \* \*